Sept. 6, 1966  G. L. SMITH  3,270,561
FLUID PRESSURE RATIO SENSOR
Filed April 24, 1964
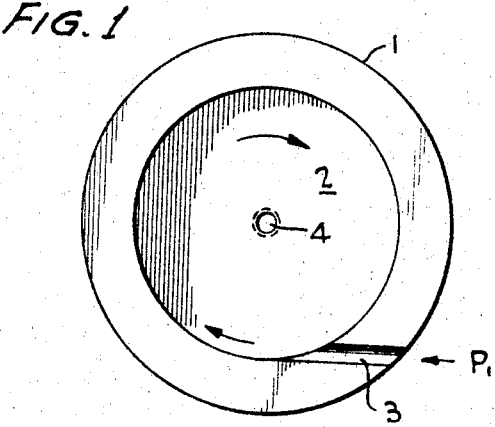
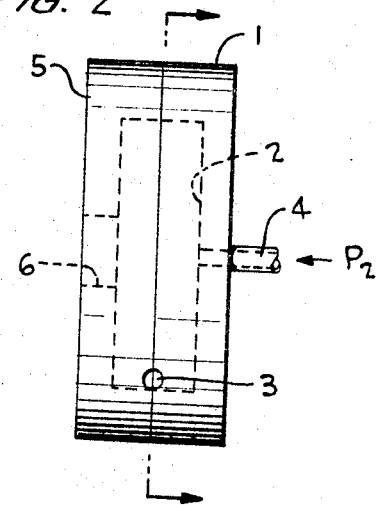
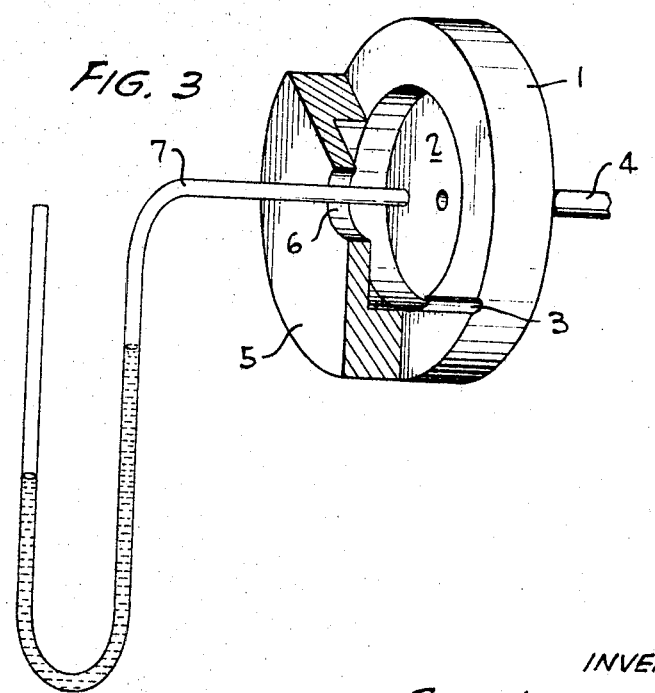
INVENTOR,
GARY LEE SMITH
BY Harry M. Saragovitz,
Edward J. Kelly,
Herbert Berl &
J. P. Edgerton

United States Patent Office 3,270,561
Patented Sept. 6, 1966

3,270,561
FLUID PRESSURE RATIO SENSOR
Gary L. Smith, Liberal, Kans., assignor to the United States of America as represented by the Secretary of the Army
Filed Apr. 24, 1964, Ser. No. 362,534
4 Claims. (Cl. 73—388)

The invention described herein may be manufactured and used by or for the Government of the United States of America for governmental purposes without the payment to me of any royalty thereon.

This invention relates generally to pressure measuring devices, and more particularly to a device that measures absolute pressure ratios without the use of moving parts.

One of the principle parameters requiring control in gas turbine engines is thrust. In earlier gas turbine engines, rotor speed was adequate for the determination of thrust. However, in recent years turbine engines have become more complex. For example, dual turbines and compressors have been developed. The two turbines and compressors may turn at much different speeds; therefore, rotor speeds are no longer adequate indicators of overall engine performance. Recent engines have used the turbine outlet pressure and the ambient temperature as a means for measuring thrust. However, this method additionally requires the measurement of ambient pressure since thrust is also dependent upon this variable. By using only the ratio of compressor outlet pressure to compressor inlet pressure and the ambient temperature, the performance of the engine may be determined. Gage pressure ratios, although easy to measure, do not have much value in aircraft applications. Variations in aircraft altitude cause large changes in ambient pressure and consequently large changes in gage pressure ratio. If the ratio of the absolute turbine outlet pressure to the compressor inlet pressure is used in place of the turbine outlet pressure alone or instead of gage pressure ratio, then the ambient pressure is automatically included.

Since absolute pressure ratios have the advantage of an automatic correction for changes in ambient pressure, absolute pressure ratio is important as a control parameter. By using only absolute pressure ratio and ambient temperature, an automatic control system would be able to control fuel flow and other engine parameters to provide the best combination of thrust and efficiency. For example, a computer within the control system could determine the absolute pressure ratio required to maintain a computed thrust. A pressure ratio regulator would sense any error in the pressure ratio and provide an error signal to the computer. The computer would then control the engine variables necessary to obtain the correct ratio.

In the prior art there are a number of devices which measure absolute pressure ratios. However, these are mechanical devices which measure pressure ratio by means of bellows and kinematic linkages. The biggest problem in the measurement of absolute pressure ratio is that some reference pressure independent of atmospheric pressure is required. In the mechanical devices, this reference pressure is provided through a system of evacuated chambers and calibrated springs. These add to complexity and construction cost and have doubtful reliability. These devices have limited military applications in severe airborne requirements.

It is therefore an object of the invention to provide a device that measures the absolute pressure ratio of two pressures.

It is another object of this invention to provide a device which has no moving parts for measuring a pressure ratio.

It is a further object of the present invention to provide a pure fluid system with no moving parts and a fast response time for measuring a pressure ratio.

According to the present invention, the foregoing and other objects are attained by providing a circular chamber into which a fluid flow under a first pressure is introduced tangentially to the periphery of the chamber thereby creating a vortex within the chamber. Another fluid flow under a second pressure is introduced at the center of the chamber, and the resulting pressure at the center of the chamber is measured providing a measurement of the ratio of the second pressure to the first pressure.

The specific nature of the invention, as well as other objects, aspects, uses and advantages thereof, will clearly appear from the following description and from the accompanying drawing, in which:

FIG. 1 is a plan view of one half section of the pressure ratio transducer for measuring the absolute pressure ratio showing the fluid flow within the circular chamber;

FIG. 2 is an edge view of the assembled pressure ratio transducer; and

FIG. 3 is a perspective view in partial section of the absolute pressure ratio measuring device according to the invention showing the placement of means for indicating pressure.

Referring now to the drawing wherein like reference numerals designate identical or corresponding parts throughout the several views, and more particularly to FIGURE 1 wherein there is shown one half section 1 of the pressure ratio transducer which has a circular chamber 2 provided therein. A fluid flow under a pressure $P_1$ enters the chamber 2 by way of a passage 3. The passage 3 is positioned so as to introduce the fluid flow tangentially into the circular chamber 2 thereby creating a vortex flow within the chamber. The resulting centrifugal force acting on the fluid within the chamber causes a decrease in pressure at the center of the chamber. Thus, as the pressure $P_1$ increases, the pressure at the center of the chamber decreases.

Reference is now made to FIGURE 2 which shows an edge view of the pressure transducer. The device is shown as comprising two sections 1 and 5 which together form the circular chamber 2. Section 5 is provided with an outlet port 6 through which the fluid in the chamber exits. Section 1 is additionally provided with an input passage 4 through which a fluid under a pressure $P_2$ flows. The passage 4 is positioned so as to introduce the fluid flow at the center of the chamber 2. This is more clearly shown in FIGURE 1. The effect of the fluid flow through the passage 4 is to increase the pressure at the center of the chamber 2. The resulting pressure at the center of the chamber is therefore inversely proportional to the pressure $P_1$ and directly proportional to the pressure $P_2$.

FIGURE 3 shows a perspective view of the pressure ratio transducer in partial section. While the transducer produces a pressure at the center of its chamber which is proportional to the ratio of the pressure $P_2$ to the pressure $P_1$, it is necessary to produce an indication of this pressure for it to be useful as a measurement. For this purpose there is shown by way of example an open tube manometer 7 which has its pressure probe positioned in the center of chamber 2. The manometer then provides a reading which is proportional to the ratio of the pressures $P_2$ and $P_1$. Of course, any other suitable pressure indicating means may be used for this purpose. Additionally, the fluid flow through the output port 6 may be used directly in a pure fluid control system such as the gas turbine control system considered earlier.

It will be apparent that the embodiment shown is only exemplary and that various modifications can be made

I claim as my invention:

1. A device for measuring the ratio of a second pressure to a first pressure comprising:
    (a) first means having no moving parts for establishing a third pressure which is inversely proportional to said first pressure,
    (b) second means having no moving parts for causing said third pressure to be directly proportional to said second pressure,
    (c) said first means including a body having a circular cavity therein, and
    (d) fourth means for introducing a first fluid flow under said first pressure tangentially in said circular cavity.

2. The device according to claim 1 wherein said second means comprises fifth means for introducing a second fluid flow under said second pressure at the center of said circular cavity.

3. A pure fluid pressure ratio sensor comprising:
    (a) means for creating a fluid vortex from a first fluid flow under a first pressure,
    (b) means for introducing a second fluid flow under a second pressure into the center of said vortex, and
    (c) means for reading out the resulting pressure of said first and second flows at said center of said vortex,
    (d) said resulting pressure being proportional to the absolute pressure ratio of said second pressure to said first pressure.

4. The pure fluid pressure ratio sensor according to claim 3 wherein:
    (a) said means for creating a fluid vortex comprising means defining a circular chamber into which said first fluid flow is introduced tangentially, and
    (b) said means for introducing said second fluid flow comprising means defining an input passage positioned so as to introduce said second fluid flow into the center of said chamber and the center of said vortex, whereby
    (c) said resulting pressure is directly proportional to said second pressure and is inversely proportional to said first pressure.

References Cited by the Examiner

UNITED STATES PATENTS

| 3,072,326 | 1/1963 | Rohmann et al. | 73—407 X |
| 3,079,074 | 2/1963 | Jordan | 73—407 |

LOUIS R. PRINCE, *Primary Examiner.*

D. O. WOODIEL, *Assistant Examiner.*